US005090576A

United States Patent [19]

Menten

[11] Patent Number: 5,090,576

[45] Date of Patent: Feb. 25, 1992

[54] METHOD AND APPARATUS FOR SORTING A FLOW OF OBJECTS AS A FUNCTION OF OPTICAL PROPERTIES OF THE OBJECTS

[75] Inventor: Emmanuel J. Menten, Leuven, Belgium

[73] Assignee: Elbicon N.V., Belgium

[21] Appl. No.: 452,875

[22] Filed: Dec. 19, 1989

[30] Foreign Application Priority Data

Dec. 19, 1988 [NL] Netherlands ........................ 8803112

[51] Int. Cl.[5] ..................... B07C 5/342; G01N 21/88; H04N 5/335

[52] U.S. Cl. .................................... 209/587; 209/639; 209/939; 250/252.1; 356/237; 358/106

[58] Field of Search ............... 209/576, 577, 580, 581, 209/585, 587, 639, 939; 250/252.1, 562, 563; 356/237; 358/106; 83/76.8, 365

[56] References Cited

U.S. PATENT DOCUMENTS

| | | | |
|---|---|---|---|
| 3,545,610 | 12/1970 | Kelly et al. | 209/585 X |
| 3,901,388 | 8/1975 | Kelly | 209/587 X |
| 3,977,526 | 8/1976 | Gordon et al. | 209/587 X |
| 4,352,430 | 10/1982 | Maier et al. | 209/581 X |
| 4,491,868 | 1/1985 | Berridge, Jr. et al. | 358/106 X |
| 4,581,632 | 4/1986 | Davis et al. | 356/376 X |
| 4,909,930 | 3/1990 | Cole | 209/939 X |

FOREIGN PATENT DOCUMENTS

| | | | |
|---|---|---|---|
| 380814 | 7/1986 | Austria . | |
| 0010940 | 5/1980 | European Pat. Off. | 209/580 |
| 8000324 | 7/1980 | Netherlands . | |
| WO88/00501 | 1/1988 | PCT Int'l Appl. . | |
| 1210777 | 2/1986 | U.S.S.R. | 209/580 |
| 1560152 | 1/1980 | United Kingdom . | |

*Primary Examiner*—Kevin P. Shaver
*Assistant Examiner*—Edward M. Wacyra
*Attorney, Agent, or Firm*—Ostrolenk, Faber, Gerb & Soffen

[57] ABSTRACT

Method and apparatus for sorting objects dependent on optical characteristics thereof. The objects are conveyed through a longitudinal sorting zone. Light reflected from the objects passing the zone is detected by at least one imaging device having at least one single line array of equally spaced light sensitive imaging elements. The line array of imaging elements is repeatedly read out in series for providing a primary line signal comprising for each scan of the line array a primary group of primary intervals corresponding to respective imaging elements. Information representing light detected by each group of primary intervals is allocated to a secondary group of secondary intervals having the same duration of a secondary line signal for each scan such that the distribution of information allocated to a secondary group corresponds linearly to the distribution of the optical properties in the zone. Allocation is possible by scanning each imaging element for the same period of time and storing the information thus obtained in one or more locations of a memory according to a predetermined distribution table. Allocation is also possible by scanning the imaging elements with different periods of time dependent on a predetermined duration table providing the secondary line signal which can be supplied to a memory which receives a constant clock frequency during writing thereof. In each case the second line signal is provided when the respective memory is read out with a constant clock frequency. Secondary intervals of secondary line signals obtained from different imaging devices may then relate to identical parts of the zone for comparison purposes and for driving object rejectors corresponding to the parts dependent on the comparison results.

14 Claims, 5 Drawing Sheets

METHOD AND APPARATUS FOR SORTING A FLOW OF OBJECTS AS A FUNCTION OF OPTICAL PROPERTIES OF THE OBJECTS

BACKGROUND OF THE INVENTION

The invention relates to a method for sorting objects as a function of optical properties of the objects, comprising: conveying the objects over an object plane, all the objects passing a strip of the object plane; detecting light rays originating from the strip by one or more image pick-up units which each have a row of image pick-up elements in an image plane of the image pick-up unit; and for each image pick-up unit: repeated scanning of the row of image pick-up elements to form a primary line signal which contains image information which is a function of the optical properties of the objects and which comprises, for each scan, a primary group of primary intervals corresponding to the image pick-up elements; comparing the line signal with at least one reference signal; and energizing, as a function of the result of comparison, an ejection device, corresponding to the comparison time instant, of a number of ejection devices for the objects arranged downstream of the strip and corresponding to sections of the strip.

A method of this type is known from practice If the method is used for sorting as a function of the light reflection of the objects and the flow of objects in the strip consists of white objects with the exception of one black object, the primary line signal of each image pick-up unit will contain a pulse produced by the detection of the black object. As a consequence of the different arrangements of the image pick-up units, the different optical properties of the image pick-up units and the non-linear relation between the number of image pick-up elements of a row of an image pick-up unit per unit of length of the strip, a pulse of this type occurs, however, at different instants in time and with different widths for the different image pick-up units. Consequently, the information obtained by an image pick-up unit about the optical properties of the strip should be processed independently of information obtained by the other image pick-up units about the optical properties of the strip in order to energize the ejection devices. As a result of this it is not possible to sort over the entire length of the strip with respect to the dimension, extending in the longitudinal direction of the strip, of the objects over which a particular colour, black in the example given, occurs. If more than one image pick-up unit is used, it is furthermore not possible to combine the information obtained by the different image pick-up units about the optical properties of the same or different sections of the objects, detected by the image pick-up units, as a function of the conditions, in accordance with predetermined rules, in order to energize the ejection devices as a function of the combined result. This limits the accuracy of the sorting, undesirable objects not being removed from the flow and too many good objects being ejected.

SUMMARY OF THE INVENTION

The object of the invention is to eliminate the drawbacks of the known method.

According to the invention, this object is achieved for the method of the type mentioned hereinbefore by consecutively assigning, in accordance with a predetermined scheme, the image information, obtained during a scan, of each group of primary intervals to a corresponding secondary group of equal secondary intervals of a secondary line signal in a manner such that the distribution of the information assigned to a secondary group corresponds linearly to the distribution of the optical properties in the strip, each secondary interval corresponding to an associated sub-section of the strip, each having an equal length. As a result of this, the information about the optical properties of each section of the strip is assigned to an equal number of secondary intervals so that it is possible to sort as a function of the length of regions of the strip having particular optical properties. Furthermore, as a result of this the data of secondary line signals from different image pickup units can be combined with one another in order to energize the ejection devices as a function of the combined result.

According to the invention, the line signal used during the comparison step may be either the primary line signal or the secondary line signal.

In the known method, all the primary intervals have equal time durations. According to the invention, the assignment scheme is therefore such that one or more secondary intervals are assigned to each primary interval or to a sub-group of primary intervals.

According to the invention, however, it is also possible to scan the row of image elements at a variable speed, the primary intervals having time durations which are determined by values derived from the system.

It is pointed out that the secondary intervals correspond to "positional elements" having equal lengths of the strip which are also called "plaxels" herein by analogy with the term "pixel" for an image pick-up element.

Preferably, with the method comprising the calibration step described in claim 5 for determining the assignment scheme of primary intervals having equal time durations is used.

As a result of the measures of claim 6, a uniform distribution and assignment of the image information over the secondary intervals is obtained.

As a result of the measures of claim 7, the calibration accuracy is matched to the ejection resolution of the ejection devices As a result of the measures of claim 8, the result is achieved that the positions, in particular the centres, of the ejection devices with respect to the primary intervals can always be determined accurately. This is especially advantageous if data obtained by means of different image pick-up units about the optical properties of the same sections of the strip have to be combined.

The invention also relates to an apparatus for sorting a flow of objects as a function of optical properties of the objects according to claim 9. The same advantages apply to this apparatus as those mentioned in the case of the method according to claim 1. The frequencies of the primary and secondary clock signals may be different and may be a function of the time which is available for processing a secondary group of intervals of the secondary line signal, which time is, for example, equal to the duration of a scan minus the duration of the first cycle. The said time can be extended as required by using a second memory consisting of identical parts and multiplexers, as described in claim 12.

The embodiment, described in claim 13, of the apparatus according to the invention has the advantage that in this case the first memory can relatively small and cheap and a single pulse can always be added, when required, between each pair of consecutive primary intervals in a simple and rapid manner.

The apparatus according to claim 14 has the advantage that, in a simple manner, the assignment of the information of the first primary interval of the actual detection zone is assigned to a location, corresponding to a first secondary interval, of the second memory, and if a plurality of image pick-up units is used, intervals having identical serial numbers from secondary line signals corresponding to the different image pick-up units occur at the same time when the second memory is read out, as a result of which the information of secondary intervals having identical serial numbers can be combined in a simple manner.

BRIEF DESCRIPTION OF THE DRAWINGS

The invention is explained with reference to the drawings. In the drawings.

DETAILED DESCRIPTION OF PREFERRED EMBODIMENTS

Figure 1:
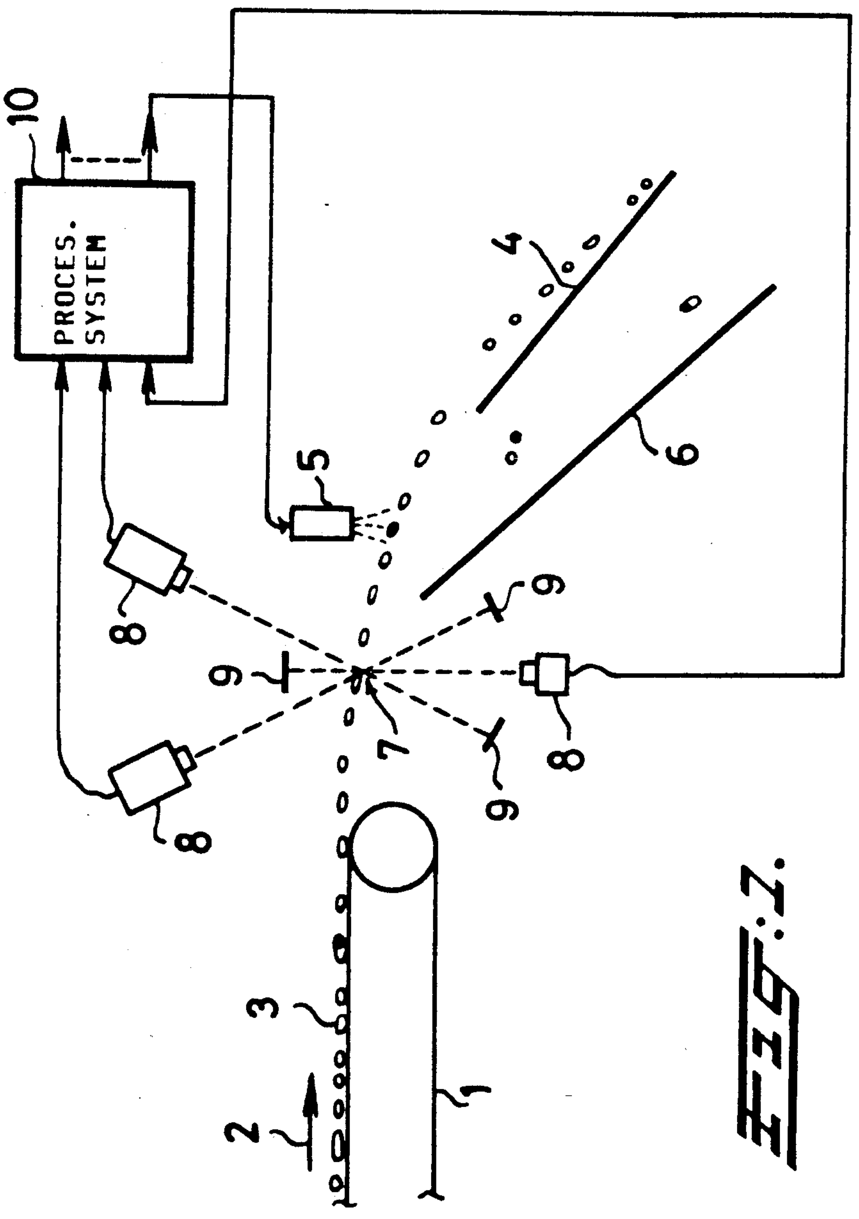
FIG. 1 shows a side elevation of a sorting apparatus which is suitable for applying the invention.

The sorting apparatus shown in FIG. 1 comprises an endless conveyor belt 1 which is displaced in the direction of the arrow 2. On the conveyor belt 2 there are a number of objects 3 which follow a ballistic trajectory on leaving the conveyor belt 1 and which fall on a slide plate 4 if they are not ejected. If the objects are ejected downwards in a manner explained below by a row of ejection devices 5 which are arranged transversely to the direction of conveyance and which are, in particular, exhaust nozzles for air, they fall onto a slide plate 6. Other conveyor belts, which are not shown, may be arranged at the bottom of the slide plates 4 and 6.

During the ballistic flight, the objects 3 follow an object plane. A strip of such object plane which is indicated at 7, and which extends perpendicular to the plane of the drawing, is detected by one or more image pick-up units 8. Opposite each image pick-up unit 8 there is a reference surface 9 having a reference reflection factor which is essentially equal to the reflection factor of good objects 3, i.e. objects which are not to be ejected by the ejection devices 5. In a practical embodiment, the apparatus comprises four image pick-up units 8, two upper units above the object plane, one being upstream and one being downstream, and two lower units beneath the object plane and approximately on either side of the flow of objects 3 (only one of these lower units being shown in FIG. 1).

The apparatus also comprises a processing system 10 which receives line signals originating from the image pick-up units 8 and which delivers control signals to the ejection devices 5.

The apparatus also comprises means, which are not shown, for illuminating the strip 7, and tubular light-screening means to prevent detection of spurious light by the image pick-up units 8.

The image pick-up units 8 may be CCD ("charge coupled device") cameras or CRT ("cathode ray tube") cameras. Each image pick-up unit 8 scans the strip 7 along a line having a number of image pick-up elements in order to deliver a primary line signal which comprises a primary group of primary intervals corresponding to the image pick-up elements for each scan. Each primary interval contains information, recorded by a corresponding image pick-up element, about the optical properties of a corresponding section of the strip.

It should be noted that the image pick-up units 8 are arranged at different positions and have different orientations, the optical properties of the image pick-up units 8 are different, and the relation between the number of image pick-up elements of a row of an image pick-up unit 8 per unit of length of the strip 7 is not linear. For these reasons, the primary intervals of the line signals of the different image pick-up units 8 will correspond to different regions of the strip 7, having different lengths. As a result of this, sorting according to width of an undesired optical property of the strip 7 with each image pick-up unit 8 individually yields very inaccurate results which do not correspond to the real dimensions, and it is impossible to combine data obtained by different image pick-up units 8. The manner in which these drawbacks can be eliminated according to the invention is explained below.

Figure 2:
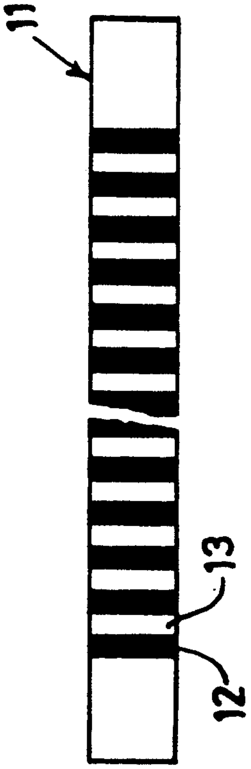
FIG. 2 shows a view of a calibration slat for use in a calibration step of the method according to the invention.

FIG. 2 shows a view of an embodiment of a calibration slat 11 which is arranged at the position of the strip 7 during a calibration phase of the method according to the invention. The edge of the calibration slat 11 shown in FIG. 2, which is detected by an image pick-up unit 8, has, in this example, a white background colour with a number of black stripes 12 thereon which have equal width and which alternate with white stripes 13 having equal width. The number of black stripes 12 is one greater than the number of ejection devices 5. The sum of the widths of a black stripe 12 and a white stripe 13 is equal to the width, seen transversely to the direction 2 of conveyance, of an ejection device 5. The stripes 12 and 13 are arranged at positions on the calibration slat 11 such that the centres of the white stripes 13 correspond to the respective centres of the ejection devices 5.

During the calibration phase, an image pick-up unit 8 which detects the side of the calibration slat 11 shown in FIG. 2 delivers, during the scanning thereof, a relatively high level alternating with low levels which correspond to the black stripes 12. The processing system 10 compares this video signal, or a signal derived therefrom without synchronization levels, with a relatively low threshold for detecting the time instants which correspond to the scanning of the centres of the black stripes 12. During this process, the processing system 10 first determines the serial number of the image pickup element of the image pick-up unit with which the centre of a black stripe 12 is first detected during the scanning of the calibration slat 11. The processing system 10 also counts, between, each pair of time instants corresponding to the centres of the black stripes 12, the number of image pick-up elements which are scanned in the process, each during a primary interval.

Figure 3:
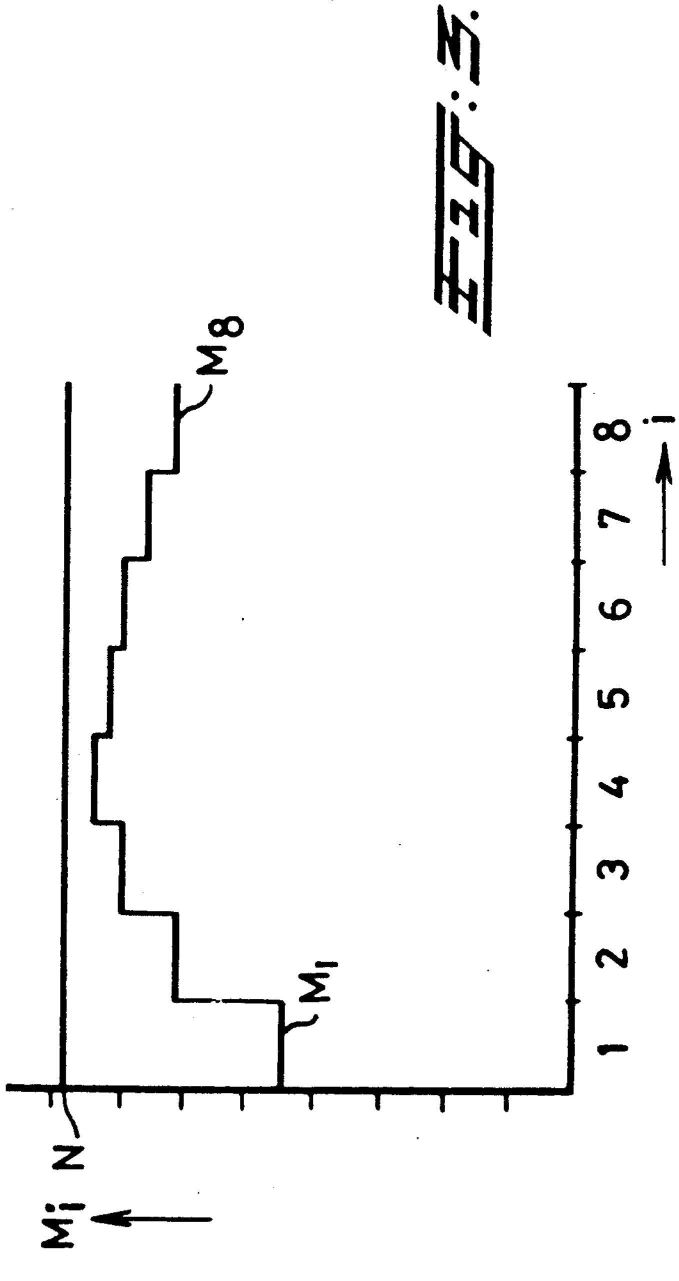
FIG. 3 shows a diagram illustrating the distribution of the numbers of pixels and plaxels over the different ejection devices of the apparatus of FIG. 1.

FIG. 3 shows an example of the numbers $M_i$ which are obtained in this process for each ejection device 5 with serial number i corresponding to one said pair of time instants. In this connection it is pointed out that, in a practical embodiment, the number of ejection devices 5 may be 64 and the number of image pick-up elements in a row of an image pick-up unit 8 maybe, for example, 2048.

From the example of FIG. 3 it is evident that the sections, corresponding to different ejection devices 5, of the strip 7 or the calibration slat 11 are detected by different numbers of image pick-up elements $M_i$. As a result of this it is not possible to sort according to width, seen transversely to the direction 2 of conveyance, of undesirable optical properties of the objects 3 on the basis of a line signal obtained from an image pick-up unit 8. Furthermore, if two or more image pickup units 8 are used, the first black stripe 12 will be scanned by the image pick-up units 8 at different time instants and the serial numbers, corresponding to said time instants, of the image pick-up elements of the different rows will therefore be different. As a result of this, it is impossible to combine information obtained with the different image pick-up units 8. Furthermore, the effective detection region which comprises all the black stripes 12 is seen by different image pick-up units 8 by means of different total numbers $\Sigma M_i$ of image pick-up elements. To solve these potential problems, the invention therefore provides a shift in the primary line signals obtained with different image pick-up units 8, a linearization of a time duration assigned for assessing optical information as a function of the scanned section of the strip 7 with a number of secondary intervals assigned to each section, and a scale adaptation for each image pick-up unit 8 to cause the end points, detected by the different image pick-up units 8, of the effective detection zone to coincide. The number of secondary intervals which under these circumstances corresponds to each ejection device 5 for each primary line signal is in this case constant and is N in the example of FIG. 3.

Figure 4:
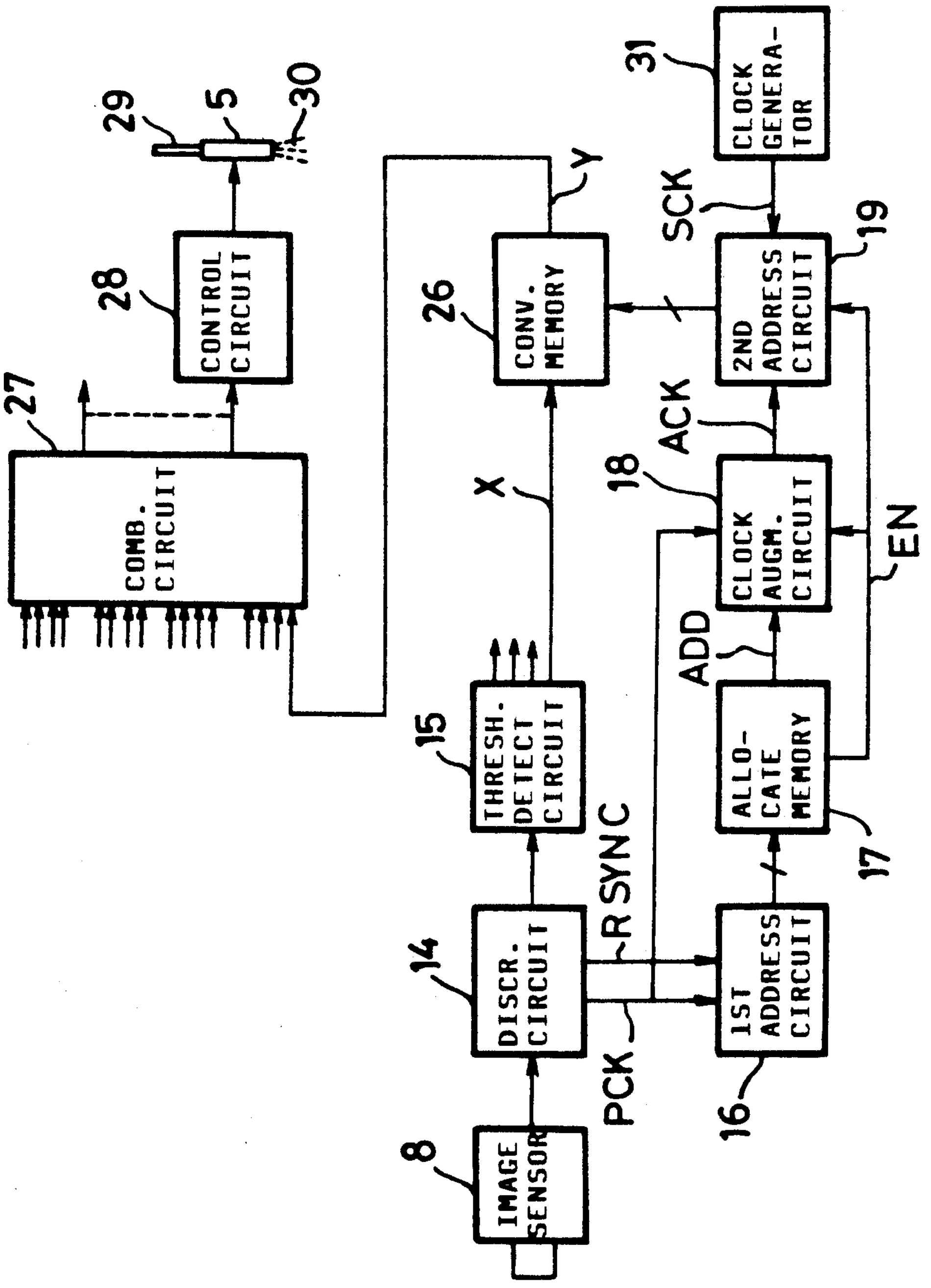
FIG. 4 shows a block diagram of a section of the processing system shown in FIG. 1.

FIG. 4 shows a block diagram of a section of the processing system 10 with which the method according to the invention can be implemented. In the diagram of FIG. 4, an output of each of the image pick-up units 8 is connected to a respective discrimination circuit 14 which delivers a primary line signal, which is stripped of synchronization levels, to a threshold detection circuit 15 which compares the primary line signal with at least one threshold and which delivers a number of detection signals corresponding with the number of thresholds.

The discrimination circuit 14 delivers a primary clock signal PCK with primary intervals, whose frequency corresponds to the scanning of the image pick-up elements of the image pick-up unit 8, and a scanning synchronization signal RSYNC, whose frequency corresponds to the consecutive scannings of the row of image pick-up elements, to a first addressing circuit 16. The addressing circuit 16 delivers an addressing signal to an assignment memory or first memory 17, the number of memory locations of which is at least as great as the number of scanned image pick-up elements of the image pick-up unit 8. Prior to sorting the objects, a scheme for assigning the secondary intervals to the primary intervals is stored in the assignment memory 17 during the calibration phase explained. In this example, each memory location contains a first bit which delivers a signal EN during reading out and which indicates whether one or more secondary intervals may be assigned to the corresponding primary interval, and it contains a second bit which delivers a signal ADD during reading out and which indicates that if EN is "1", two secondary intervals must be assigned to the corresponding primary interval instead of one secondary interval. To implement this assignment, the signals ADD and EN are delivered to a clock increasing circuit 18.

Figure 5:
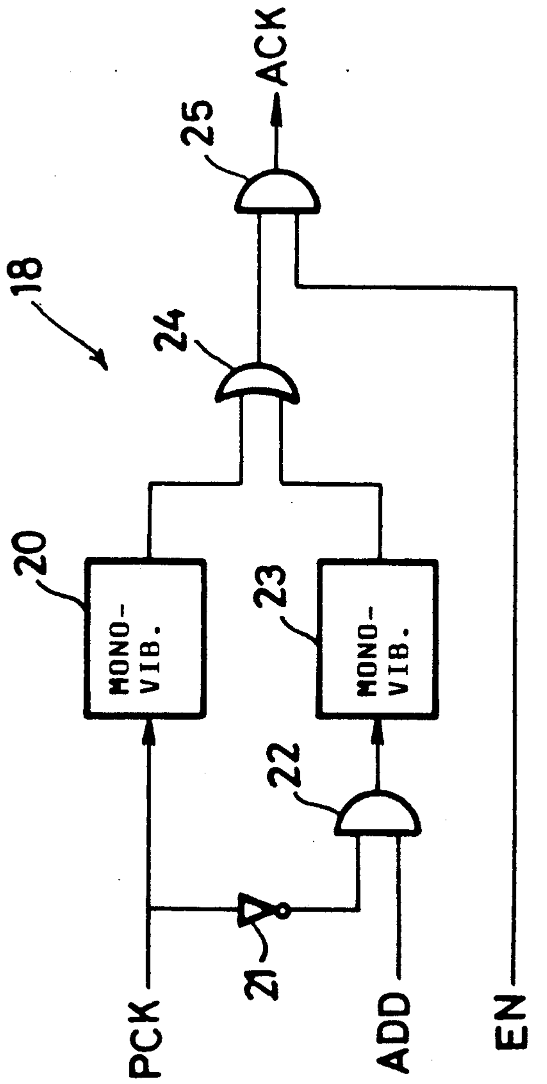
FIG. 5 shows a diagram of an embodiment of the clock increasing circuit of FIG. 4.

FIG. 5 shows a diagram of an embodiment of the clock increasing circuit 18. The circuit 18 receives the signals PCK, ADD and EN, and delivers the desired primary clock signal ACK with secondary intervals to a second addressing circuit 19. In the diagram of FIG. 5, the signal PCK is delivered to a first monostable multivibrator 20 and via an inverter 21 and an AND gate 22, to a second monostable multivibrator 23. Another of the AND gate 22 receives the signal ADD. On being energized, the monostable multivibrators 20 and 23 each deliver a pulse whose time duration is shorter than half the time duration of a primary interval The outputs of the multivibrators 20 and 23 are connected to inputs of an OR gate 24, whose output is connected to an input of an AND gate 25, another input of which receives the signal EN and an output of which delivers the signal ACK.

The second addressing circuit 19 delivers an address signal to a conversion memory or second memory 26 which receives a detection signal X corresponding to a threshold at a data input of the threshold detection circuit 15. A data output of the conversion memory 26 delivers an output signal Y to an input of a combination circuit 27 which has, for each image pick-up unit 8, a group of such inputs corresponding to the thresholds for said image pick-up unit 8. The combination circuit 27 has a number of outputs which are each connected to a respective control circuit 28, an output of which is connected to a control input of an ejection device 5 which is, in particular, an air valve, an air inlet of which is connected via a pipe 29 to a source of compressed air, which is not shown, in order to selectively deliver a surge of air 30.

During a first period, the conversion memory 26 is addressed via the second addressing circuit 19 by counting the pulses of the assignment clock signal ACK. This first period corresponds to a scanning of the effective zone of the strip 7 and is determined by the logic level "1" of the signal EN. During this period, the information of the detection signal received from the detection circuit 15 is written into the conversion memory 26.

During a second period, when EN is "0", the pulses of a secondary clock signal delivered by a clock generator 31 and having secondary intervals are counted instead of the pulses of the signal ACK in order to address the conversion memory 26. During the second period, the conversion memory 26 is read in order to deliver an output signal to the combination circuit 27. The frequency of the secondary clock signal SCK is so high that all the locations of the conversion memory 26 which were written in during the first period are read out during the second period.

In the example illustrated, not more than one additional secondary interval can be assigned to each primary interval. For this reason, the additional secondary intervals additionally to be assigned to a subgroup $M_i$ of primary intervals corresponding to the difference between the number $M_i$ (see FIG. 3) and a reference number N are distributed over the sub-group $M_i$. The total number of secondary intervals which can correspond to said sub-group $M_i$ of primary intervals is then, however, limited to $2\times M_i$, while said number of secondary intervals must also be less than the maximum number Mmax of all the $M_i$ for all values of i and for all the image pickup units. For this reason, the reference number N is, in this example, chosen as equal to the maximum number Mmax possibly increased by a small marginal number, for example 2, during the setting up of the assignment scheme which is stored in the assignment memory 17.

Figure 6:
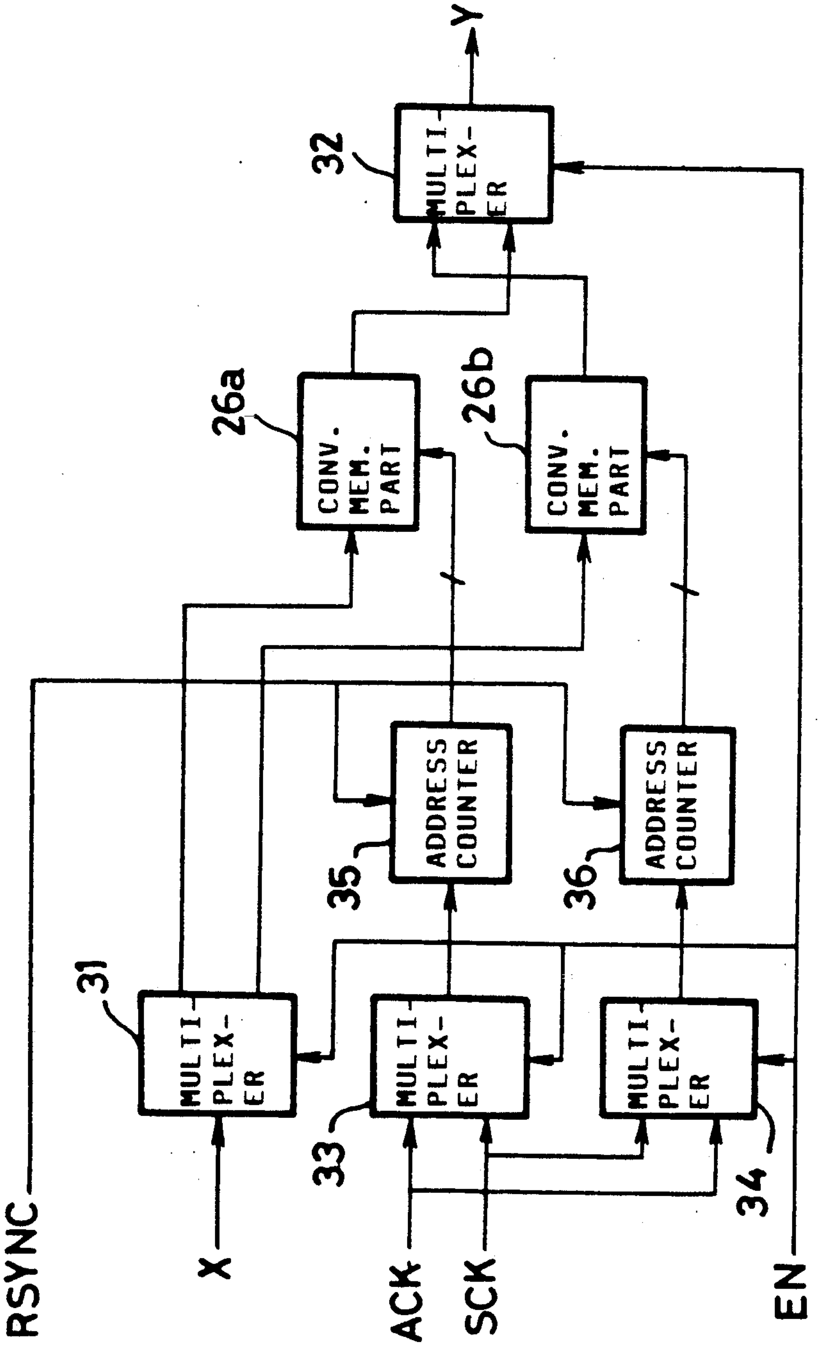
FIG. 6 shows a block diagram of another embodiment of the second memory and the second addressing means of FIG. 4.

FIG. 6 shows a block diagram of a modified section of the addressing circuit 19 and the conversion memory 26 of the diagram of FIG. 4, the memory 26 being divided into two parts 26*a* and 26*b* which are each suitable to have information from the detection signal X written in during a first period and to be read out during a second period in order to deliver the output signal Y to the combination circuit 17. When writing into the part 26*a* is taking place, the part 26*b* is read out and vice versa, so that the duration of the second period is extended with respect to the second period for the embodiment according to FIG. 4, as a result of which less fast and cheaper circuits 19 and 26 can be used. For this purpose, the diagram of FIG. 6 comprises a multiplexer 31 for selectively delivering the detection signal X to the memory parts 26*a* and 26*b*, a multiplexer 32 for selectively transmitting the output signals of the memory parts 26*a* and 26*b* as output signal Y and two multiplexers 33 and 34 which receive the assignment clock signal ACK and the secondary clock signal SCK and which alternately transmit, differently for the multiplexers 33 and 34, said clock signals to addressing counters 35 and 36 respectively which also receive the scan synchronization signal RSYNC as reset signal and which deliver address signals to the memory parts 26*a* and 26*b* respectively. The multiplexers 31, 32, 33 and 34 are controlled by the signal EN.

It is pointed out that the diagram of FIG. 6 can be extended for a larger number of parts of the memory 26.

The memory 26 may be a memory having combined inputs and outputs which can assume three states. Gates which are alternately enabled by the signal EN then have to be provided in the connections for the signals X and Y in the diagram of FIG. 4.

The memory 26 may furthermore be an analog memory, for example a bucket brigade shift register, for storing analog samples therein, the threshold detection circuit 15 being capable of being connected to the output of the memory 26. In this case, only one assignment memory, such as the memory 26, is necessary for each image pick-up unit 8 for all the thresholds of the threshold detection circuits 15 connected to the output of said memory.

It is furthermore pointed out that the reference number N (FIG. 3) may be arbitrary in other embodiments, in particular if the size of the assignment memory 17 is larger, the difference between each number $M_i$ and the reference number N for assigning additional secondary intervals possibly not being distributed uniformly over the respective sub-group of primary intervals $M_i$. In most cases, however, the embodiment explained on the basis of FIG. 4 will be adequate, the Mmax/Mmin ratio being capable of being a maximum of 2, where Mmin is the minimum number of all the $M_i$'s for all the values of i and for all the image pick-up units.

It is pointed out that, according to claim 1, the invention also relates to a use of an assignment scheme stored in an assignment memory such as the assignment memory 17 which is such that equal secondary intervals are assigned to primary intervals during the scanning. In that case, the assignment memory can be read out via addressing means, such as the addressing circuit 16, with a fixed frequency and at the same time deliver an output signal to an oscillator which delivers, as output signal, a primary clock signal for the scanning of the image pick-up elements of the image pick-up unit 8 which is such that the time durations of primary intervals thereof are a function of the output signal of the assignment memory, so that the image pick-up elements are scanned with variable speed and the information from the primary line signal obtained in the process is assigned, by distribution over equal intervals, to equal secondary intervals, corresponding thereto, of a secondary line signal and each secondary interval consequently corresponds to a unit of length of the strip.

I claim:

1. A method for sorting objects as a function of optical properties of the objects, comprising: conveying the objects over an object plane, all the objects passing a strip of the object plane; detecting light rays originating from the strip by one or more image pick-up units which each have a row of image pick-up elements in an image plane of the image pick-up unit;

and for each image pick-up unit: repeated scanning of the row of image pick-up elements to form a primary line signal which contains image information which is a function of the optical properties of the objects and which comprises, for each scan, a primary group of primary intervals corresponding to the image pick-up elements;

comparing the line signal with at least one reference signal; and energizing, as a function of the result of comparison, an ejection device, corresponding to the comparison time instant, of a number of ejection devices for the objects arranged downstream of the strip and corresponding to sections of the strip;

and comprising consecutively assigning, in accordance with a predetermined scheme, the image information, obtained during a scan, of each group of primary intervals to a corresponding secondary group of equal secondary intervals of a secondary line signal in a manner such that the distribution of the information assigned to a secondary group corresponds linearly to the distribution of the optical properties in the strip, each secondary interval corresponding to an associated sub-section of the strip, each having an equal length.

2. Method according to claim 1, wherein a value corresponding to the duration of the corresponding primary interval is derived from the scheme for each image pick-up element and that the corresponding image pick-up element is scanned with said duration.

3. Method according to claim 1, and comprising combining, after the assignment step, information about the optical properties of the strip available from the secondary groups of intervals of the respective secondary line signals of different image pick-up units in accordance with one or more predetermined rules; and the energizing of the ejection devices as a function of the result of combination.

4. Method according to claim 1, wherein the information assigned to the secondary line signal is formed by the comparison results obtained during the comparison step for each primary interval.

5. Method according to claim 1, and comprising determining, in a calibration step preceding the assignment step, the assignment scheme for the -assigning, the calibration step comprising:

placing, at the position of the strip, a calibration slat on which a row of stripes extending in the direction of conveyance and consisting of a number of stripes with an equal width having a first optical property and a number of stripes with an equal width having another optical property is provided in an alternating manner;

counting, during a scan, the number of primary intervals with equal time durations between each pair of consecutive transgressions in a predetermined direction of a reference level by the primary line signal, the pairs occurring in a primary group corresponding to the primary sub-group primary intervals;

assigning the information of the first interval of the first sub-group of a primary group to the first interval of a secondary group; and determining the difference, called the assignment difference, between the number of intervals of each primary sub-group and a reference number which is at least as great as the maximum number of all the numbers of counted primary intervals of all the sub-groups for all the image pick-up units; during the assignment, of information of each primary sub-group being assigned, during the assignment to a corresponding secondary sub-group of a number of secondary intervals which is equal for all the secondary sub-groups.

6. Method according to claim 5, wherein the number of secondary intervals corresponding to an assignment difference is uniformly distributed between the occurrences of the intervals of the associated primary sub-group.

7. Method according to claim 5, wherein the sum of the widths of two stripes having different optical properties is equal to the length of a corresponding section of the strip for an ejection device.

8. Method according to claim 5, wherein the reference level is chosen in a manner such that the transgression thereof by the primary line signal occurs essentially in the centre of the stripes having one of the optical properties.

9. An apparatus for sorting a flow of objects as a function of optical properties of the objects, comprising:

conveyance means for conveying the objects over an object plane, all the objects passing a strip of the object plane;

light pick-up means which comprise one or more image pick-up units each having a row of image pick-up elements in an image plane of the image pick-up unit, each image pick-up unit scanning the optical properties of the strip along a line and delivering a corresponding primary line signal which comprises, for each scan, a primary group of primary intervals corresponding to the image pick-up elements;

ejection means for the objects arranged downstream of the strip;

and for each image pick-up unit:

comparison means for comparing the image signal with at least one reference signal;

and in which the ejection means are linked to control means which energize an ejection device corresponding to the comparison time instant as a function of the comparison result, and comprising a first memory in which a scheme for assigning, during each scan, secondary intervals of a secondary group of a secondary line signal to the primary intervals is stored, the number of secondary intervals of a secondary group being greater than the number of primary intervals of a primary group;

first addressing means which receive a primary clock signal with a clock pulse for each primary interval and which address the first memory;

a clock pulse increasing circuit which receives an output signal from the first memory and which delivers an assignment clock signal with a pulse for each primary interval plus a number of additional pulses which is a function of the output signal of the first memory;

a second memory which is written into during a first period and during this process receives the primary line signal and which is read out during a second period and during this process delivers the secondary line signal; and second addressing means which, during the first period, address the second memory as a function of the assignment clock signal and which, during the second period, address the second memory as a function of a secondary clock signal.

10. Apparatus according to claim 9, and comprising a combinatorial circuit which combines the information, available in secondary intervals of the respective secondary line signals from different image pick-up units, about the optical properties of the strip in accordance with one or more predetermined rules and which controls the control means as a function of the result of combination.

11. Apparatus according to claim 9, wherein the comparison means corresponding to each image pick-up unit receive the corresponding primary line signal and deliver the comparison results, obtained for each line signal, for the different reference signals in corresponding primary intervals of an input signal to the second memory.

12. Apparatus according to claim 9, wherein the second memory consists of a number of parts to be addressed independently of one another, inputs and outputs of the parts being connected via multiplex circuits to the second addressing means, an input for the primary line signal and an output for the secondary line signal, and the second addressing means controlling the multiplex circuits in a manner such that the parts consecutively receive the primary line signal during consecutive first periods and each part delivering the secondary line signal subsequent to the reception of the primary line signal by the part during a second period.

13. Apparatus according to claim 9, wherein the first memory comprises a memory location of one bit for each primary interval in order to be able to assign one or two secondary intervals to the primary interval.

14. Apparatus according to claim 9, wherein the first memory comprises a memory location for each primary interval in order to store therein an item of data, the value of which is a function of the assignment of a secondary interval to the primary interval and in order to deliver a blocking signal to block the assignment clock signal in accordance therewith when the first memory is being read out.

* * * * *